United States Patent [19]
Kano et al.

[11] Patent Number: 5,271,360
[45] Date of Patent: Dec. 21, 1993

[54] VALVE OPENING AND CLOSING TIMING CONTROL APPARATUS

[75] Inventors: Junichi Kano, Kariya; Kongoh Aoki, Toyota; Yasushi Miura, Toyoake, all of Japan

[73] Assignees: Aisin Seiki Kabushiki Kaisha, Kariya; Toyota Jidosha Kabushiki Kaisha, Toyota, both of Japan

[21] Appl. No.: 789,681

[22] Filed: Nov. 8, 1991

[30] Foreign Application Priority Data

Nov. 8, 1990 [JP] Japan ................................ 2-304495
Nov. 8, 1990 [JP] Japan ................................ 2-304496
Nov. 8, 1990 [JP] Japan ................................ 2-304497

[51] Int. Cl.$^5$ ............................ F01L 1/34; F01L 9/02
[52] U.S. Cl. ............................ 123/90.17; 123/90.12; 123/90.31; 123/90.33; 464/2
[58] Field of Search ............... 123/90.12, 90.13, 90.15, 123/90.17, 90.31, 90.33, 90.34; 464/2, 160

[56] References Cited

U.S. PATENT DOCUMENTS

| | | | |
|---|---|---|---|
| 4,856,465 | 8/1989 | Denz et al. | 123/90.17 |
| 4,909,194 | 3/1990 | Bauer | 123/90.15 |
| 4,930,465 | 6/1990 | Wakeman et al. | 123/90.12 |
| 4,932,379 | 6/1990 | Tang et al. | 123/491 |
| 4,934,348 | 6/1990 | Yagi et al. | 123/90.17 |
| 4,995,351 | 2/1991 | Ohkubo et al. | 123/90.15 |
| 5,058,539 | 10/1991 | Saito et al. | 123/90.17 |
| 5,067,450 | 11/1991 | Kano et al. | 123/90.17 |
| 5,085,181 | 2/1992 | Feuling | 123/90.12 |
| 5,103,780 | 4/1992 | Ishii | 123/90.17 |
| 5,113,811 | 5/1992 | Rembold et al. | 123/90.12 |

FOREIGN PATENT DOCUMENTS

| | | | |
|---|---|---|---|
| 62-3111 | 1/1987 | Japan. | |
| 63-131808 | 6/1988 | Japan. | |
| 245408 | 10/1990 | Japan | 123/90.17 |
| 3628 | 3/1991 | PCT Int'l Appl. | 123/90.17 |

*Primary Examiner*—E. Rollins Cross
*Assistant Examiner*—Weilun Lo
*Attorney, Agent, or Firm*—Oblon, Spivak, McClelland, Maier & Neustadt

[57] ABSTRACT

A valve opening and closing timing control apparatus is disclosed, which includes an engine including a cam shaft and a crank shaft, a first sensor adapted for detecting rotary positions of the cam shaft, a second sensor adapted for detecting rotary positions of the crank shaft, a hydraulic pump driven by the crank shaft, a rotary phase varying means disposed on the cam shaft and adapted for varying rotary phases of the cam shaft, a hydraulic line connecting the hydraulic pump and the rotary phase varying means, a hydraulic control means disposed in the hydraulic line, an electronic control means adapted for controlling the hydraulic means and receiving output signals which are output by the first sensor and the second sensor at least, thereby operating the rotary phase varying means with the hydraulic control means under linear control. The electronic control means detects the rotary positions of the cam shaft and the crank shaft and operates the rotary phase varying means with the hydraulic control means under the linear control in order to establish an optimum valve opening and closing timing depending on engine conditions. Hence, the valve opening and closing timing control apparatus can establish the valve opening and closing timing at optimum and desired occasions, which distinguishes over the conventional digitized valve opening and closing timing.

10 Claims, 3 Drawing Sheets

VALVE OPENING AND CLOSING TIMING CONTROL APPARATUS

BACKGROUND OF THE INVENTION

1. Field of the Invention

The present invention relates to a valve opening and closing timing control apparatus, and more particularly it relates to a valve opening and closing timing control apparatus which controls the opening and closing timing of engine valves linearly under a variety of engine conditions.

2. Description of the Related Art

There is a conventional technique which relates to the present invention and which is disclosed in Japanese Unexamined Patent Publication (KOKAI) No. 3,111/1987, for example.

A conventional valve opening and closing timing control apparatus 80 will be hereinafter described with reference to FIG. 3. In the apparatus 80, there are provided a timing pulley 81 including a helical spline which is formed in its inner peripheral portion and a transmitter member 82 including a helical spline which is formed in its outer peripheral portion. Further, a ring-shaped piston means 83 including helical splines which are formed respectively in its inner and outer peripheral portions is disposed between the timing pulley 81 and the transmitter member 82, and it engages with them. Furthermore, an outer peripheral surface of the timing pulley 81 is engaged with a timing belt 91, and accordingly the timing pulley 81 is driven by a crank shaft (not shown) of an engine (not shown).

In the valve opening and closing timing control apparatus 80, the transmitter member 82 is fixed to a cam shaft 85 with a bolt 84 so that the transmitter member 82 and the cam shaft 84 do not rotate relatively to each other. The piston means 83 is divided into two component parts in its axial direction, and a spring 86 is disposed between the two component parts so as to construct what is called a scissors gear. With this construction, when rotary torques are transmitted from the timing pulley 81 to the transmitter member 82 by way of the piston means 83, it is possible to reduce the meshing noises resulting from the backlashes or the like between the helical splines.

In addition, a pressure receiving plate 87 is disposed on the left-hand side of the piston means 83 in FIG. 3, and it moves together with the piston means 83. Hence, the pressure receiving plate 87 moves the piston means 83 in the right and left directions in FIG. 3 depending on the hydraulic pressures in a hydraulic line 88. Further, a spring 90 is provided in a space 89 which is disposed on the right-hand side of the piston means 83 in FIG. 3, and it urges the piston means 83 to an initial position (i.e., to a left-most position in FIG. 3).

In the above-described conventional valve opening and closing timing control apparatus 80, however, the hydraulic pressures which are introduced into the hydraulic line 88 are controlled only by turning on and off a hydraulic control valve (not shown). As a result, only two occasions are available for the valve opening and closing timing. However, it is preferred that the valve opening and closing timing always be available at optimum and desired occasions, since an engine is required to have high performance.

SUMMARY OF THE INVENTION

It is therefore an object of the present invention to provide a valve opening and closing timing control apparatus which enables the valve opening and closing timing to be available at optimum and desired occasions.

The above and other objects are achieved by a valve opening and closing timing control apparatus according to the present invention which comprises an engine including a cam shaft and a crank shaft; a first sensor adapted for detecting rotary positions of the cam shaft; a second sensor adapted for detecting rotary positions of the crank shaft; a hydraulic pump driven by the crank shaft; a rotary phase varying means disposed on the cam shaft and adapted for varying rotary phases of the cam shaft; a hydraulic line connecting the hydraulic pump and the rotary phase varying means; a hydraulic control means disposed in the hydraulic line; an electronic control means adapted for controlling the hydraulic means and receiving output signals which are output by the first sensor and the second sensor at least, thereby operating the rotary phase varying means with the hydraulic control means under linear control.

In accordance with the valve opening and closing timing control apparatus according to the present invention, the rotary phase varying means are operated under the linear control, not under the conventional turning on and off control. As a result, the valve opening and closing timing can always be established at optimum and desired occasions.

Further, in the case that the hydraulic pump is constructed to include a first hydraulic pump and a second hydraulic pump, and that the hydraulic line is constructed to connect the second hydraulic pump with the rotary phase varying means, the rotary phase varying means comes to be subjected to discharge pressures of the second hydraulic pump. Consequently, hydraulic pressures to be introduced into the rotary phase varying means can be raised by the second hydraulic pump even when a number of engine revolutions (hereinafter simply referred to as "engine speeds") are low and discharge pressures of the first hydraulic pump are low. As a result, a highly pressurized oil can always be introduced into the rotary phase varying means, and accordingly the operation of the rotary phase varying means cannot be adversely affected by the engine speeds.

Furthermore, in the case that the engine is constructed to further include an oil pan, and that a hydraulic pressure adjustment line which connects the hydraulic line with the oil pan is included in the present valve opening and closing timing control apparatus, and that a hydraulic pressure adjustment valve is disposed in the hydraulic pressure adjustment line, and that the electronic control means is further adapted for controlling the hydraulic control means and the hydraulic pressure adjustment valve, hydraulic pressures in the hydraulic line can be adjusted by operations of the hydraulic pressure adjustment line and the hydraulic pressure adjustment valve. As a result, loads of the hydraulic line can be made variable depending on loads to which the rotary phase varying means are subjected, and accordingly the rotary phase varying means is ensured to operate smoothly.

As having been described briefly so far, in accordance with the present invention, the valve opening and closing timing can always be established at optimum and desired occasions by operating the rotary phase varying means under the linear control with the hydraulic control means which is operated under the duty cycle control.

When a viscous fluid damping means is further incorporated into the rotary phase varying means, the rotary phase varying means can be constructed so that it effectively absorbs varying torques which result from valve springs and to which the cam shaft is subjected.

Further, when the hydraulic pump is constructed to include the first hydraulic pump and the second hydraulic pump, and when the discharge pressures of the second hydraulic pump are adapted to act on the rotary phase varying means, the hydraulic pressures to be introduced into the rotary phase varying means can be raised by the second hydraulic pump. Thus, even when the engine speeds are low and when the discharge pressures of the first hydraulic pump are low, a highly pressurized oil can always be introduced into the rotary phase varying means, and accordingly the operation of the rotary phase varying means cannot be adversely affected by the engine speeds.

Furthermore, when the hydraulic pressures in the hydraulic line are adjusted by the operations of the hydraulic pressure adjustment line and the hydraulic pressure adjustment valve, the loads of the hydraulic line can be made variable depending on the loads to which the rotary phase varying means are subjected, and accordingly the rotary phase varying means can be ensured to operate smoothly. In addition, when maintaining the phases of the rotary phase varying means or when angularly retracting the phases of the rotary phase varying means, it is unnecessary to supply the discharge pressures of the hydraulic pump to the hydraulic line. As a result, the loads of the hydraulic pump can be reduced.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiment which is provided herein for purposes of illustration only and are not intended to limit the scope of the appended claims.

Figure 1:
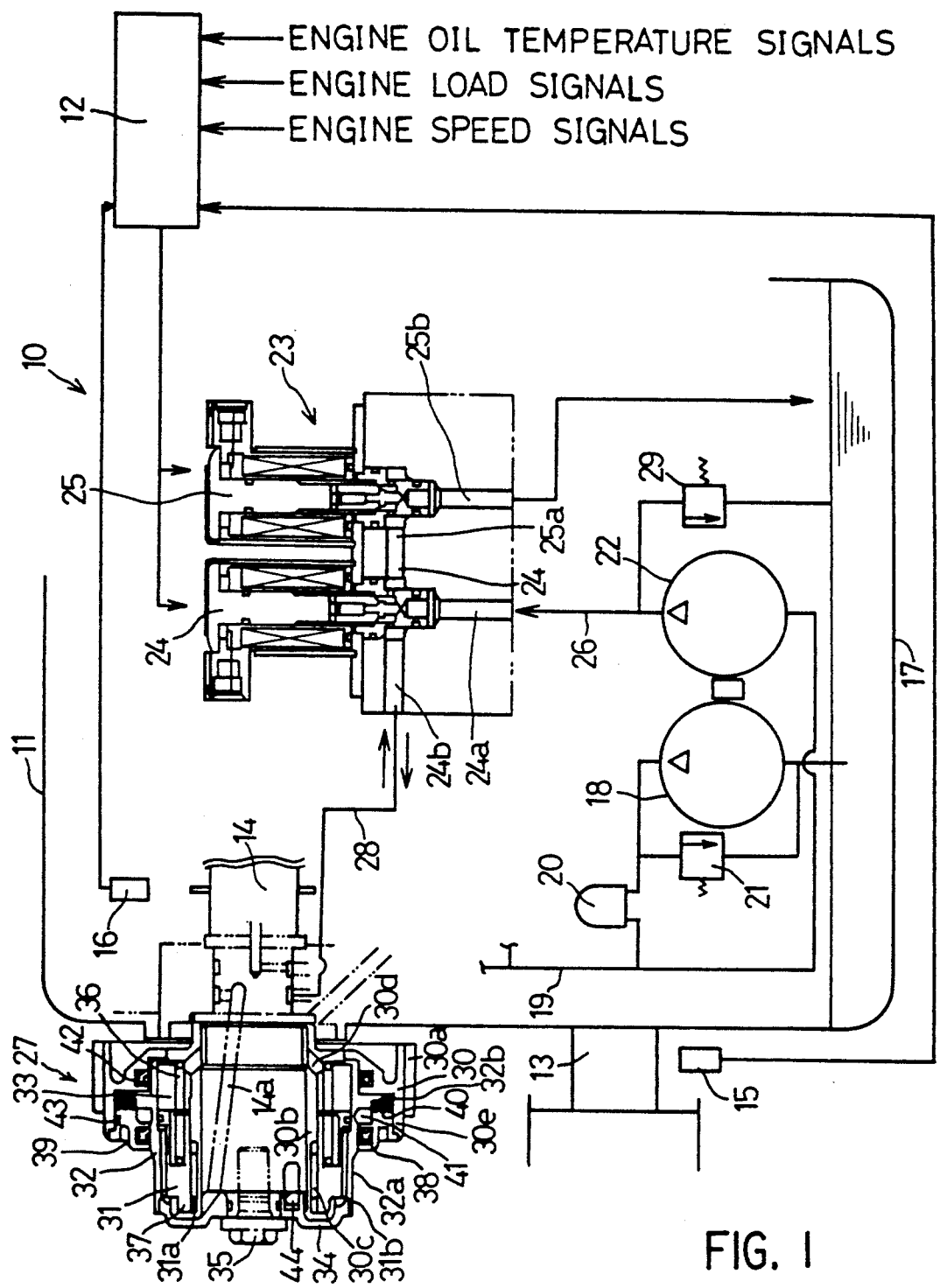
FIG. 1 is a construction diagram which illustrates major features of a valve opening and closing timing control apparatus of a preferred embodiment according to the present invention.

A valve opening and closing timing control apparatus 10 of a preferred embodiment according to the present invention will be hereinafter described with reference to FIGS. 1 and 2. As illustrated in FIG. 1, the valve opening and closing timing control apparatus 10 is disposed on an engine 11, and virtually all of its operations are controlled by an electronic control apparatus 12.

The engine 11 includes a crank shaft 13 and a cam shaft 14 which is driven by the crank shaft 13 by way of a conveyor means (not shown). For instance, the conveyor means can be a belt member, such as a "V" belt and a cogged belt, a gear member or the like. The rotary positions of the crank shaft 13 and the cam shaft 14 are detected by a crank shaft rotary position sensor (i.e., the second sensor) 15 and a cam shaft rotary position sensor (i.e., the first sensor) 16 respectively.

As shown in FIG. 1, in addition to signals which are output by the crank shaft rotary position sensor (i.e., the second sensor) 15 and the cam shaft rotary position sensor (i.e., the first sensor) 16, the electronic control apparatus 12 receives other signals, for example, engine oil temperature signals, engine load signals, engine speed signals or the like.

An oil for lubricating the engine 11 is always stored in an oil pan 17 which is disposed under a lower body portion of the engine 11. When the engine 11 is operating, a first hydraulic pump (i.e., the hydraulic pump) 18 is driven by the crank shaft 13. Accordingly, the oil is pressurized and delivered to the sections of the engine 11 by the first hydraulic pump 18 by way of a hydraulic circuit 19. The hydraulic circuit 19 is provided with an oil filter 20, a relief valve 21 and the like. Likewise, a second hydraulic pump (i.e., the hydraulic pump) 22 is driven by the crank shaft 13 so that it suctions the oil from the hydraulic circuit 19 and discharges the suctioned oil to a hydraulic control means 23.

The hydraulic control means 23 includes a first hydraulic control valve 24 and a second hydraulic control valve 25, and it is operated under duty cycle control by the electronic control apparatus 12. A first port 24a of the first hydraulic control valve 24 communicates with a discharge line (i.e., the hydraulic line) 26 of the second hydraulic pump 22, a second port 24b thereof communicates with an operation line (i.e., the hydraulic line) 28 which is connected to a rotary phase varying means 27, and a third port 24c thereof communicates with a first port 25a of the second hydraulic control valve 25. Further, a second port 25b of the second hydraulic control valve 25 communicates with the oil pan 17. Moreover, the discharge line 26 is provided with a relief valve 29.

Figure 2:
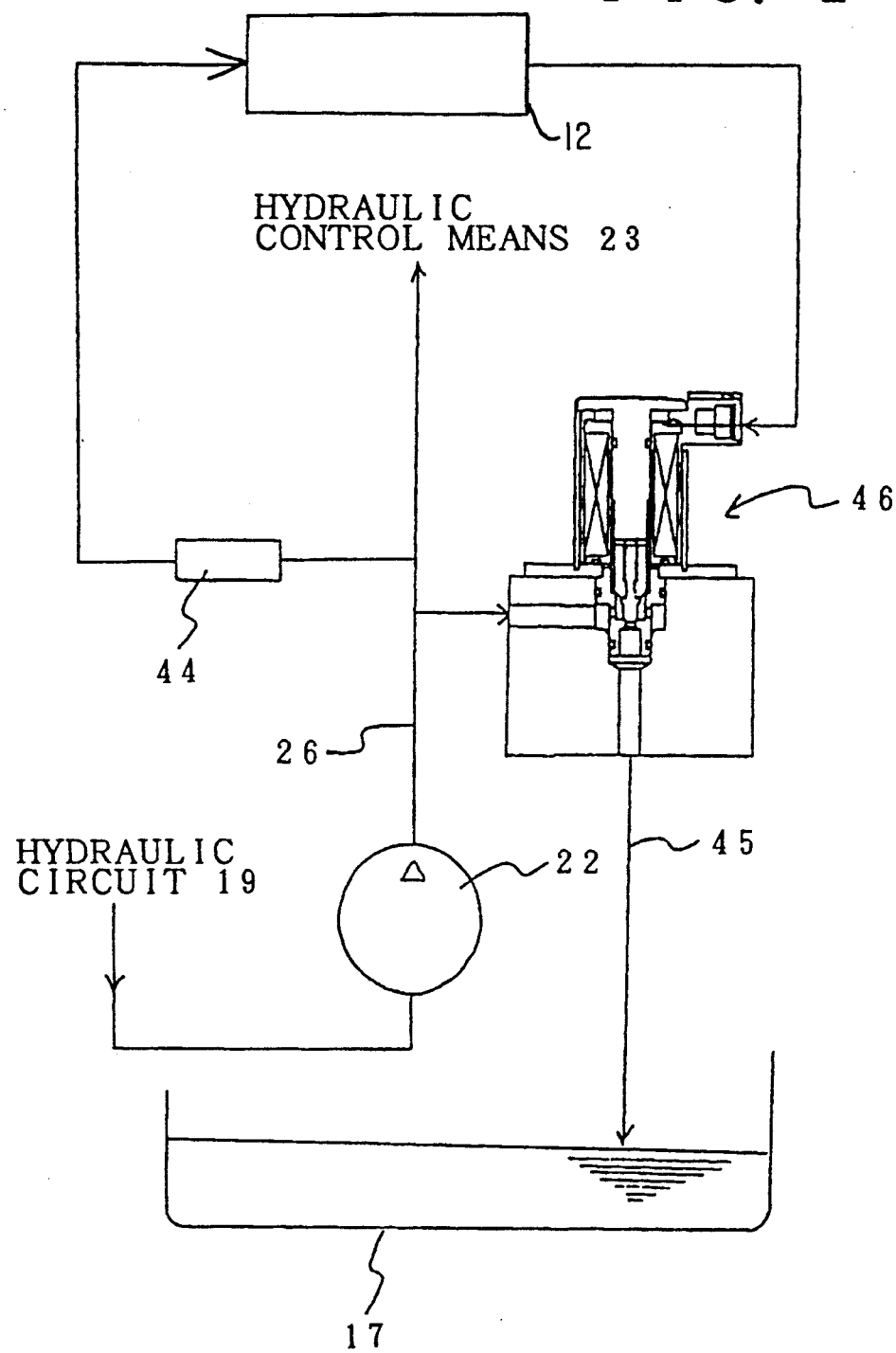
FIG. 2 is a supplementary construction diagram which illustrates extra features of the valve opening and closing timing control apparatus shown in FIG. 1.
Figure 3:
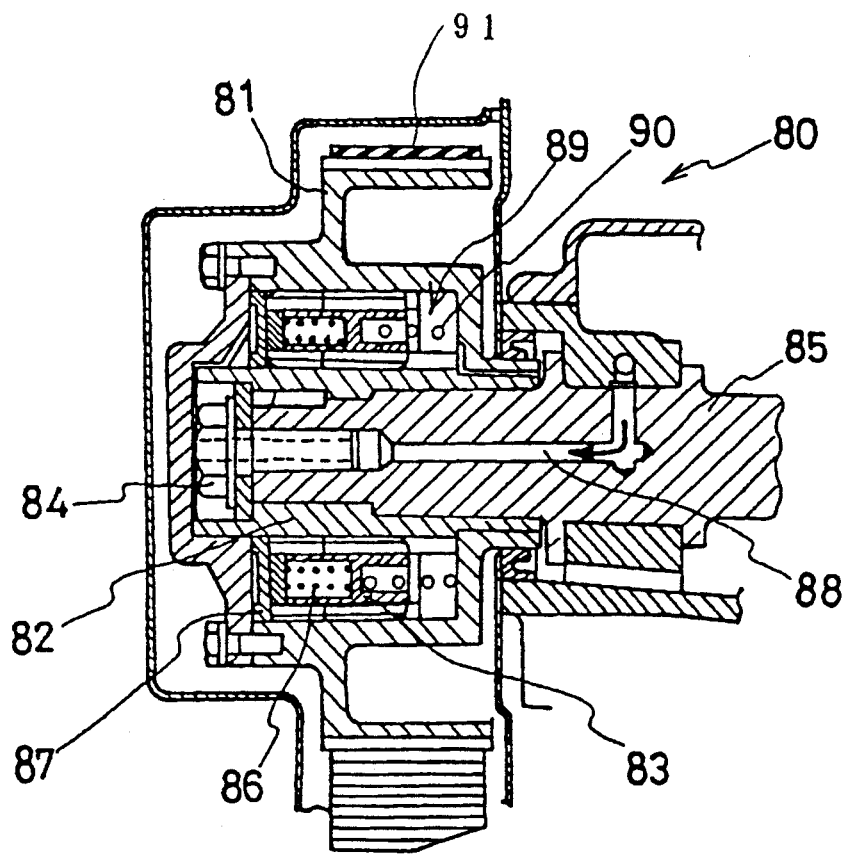
FIG. 3 is a cross sectional view of a conventional valve opening and closing timing control apparatus.

Although the following extra features of the valve opening and closing timing control apparatus 10 are not illustrated in FIG. 1, the discharge line 26 is provided with a pressure sensor 44 whose output signals are also input into the electronic control apparatus 12, as illustrated in FIG. 2. In addition, the discharge line 26 is further provided with a hydraulic pressure adjustment line 45 which communicates with the oil pan 17. Moreover, the hydraulic pressure adjustment line 45 is provided with a hydraulic pressure adjustment valve 46 at its intermediate portion.

Turning back to FIG. 1, the rotary phase varying means 27 is disposed at an end of the cam shaft 14, and it not only transmits the torque of the crank shaft 13 to the cam shaft 14 but also varies rotary phases of the cam shaft 14. The cam shaft 14 engages with a plurality of intake valves (not shown) and exhaust valves (not shown). Hence, as the cam shaft 14 rotates, the intake valves and the exhaust valves operate to open and close intake passages and exhaust passages respectively.

A timing pulley 30 is disposed around the cam shaft 14 in a relatively rotatable manner, and it engages with the above-mentioned conveyor means (i.e., a belt member, a gear member or the like) on its radially outermost peripheral surface 30a. Further, the timing pulley 30 is provided with a helical spline 30c which is formed in its radially innermost peripheral surface 30b. Furthermore, a ring-shaped piston 31 (i.e., the piston means) is provided with a helical spline 31a which is formed in its inner peripheral surface so as to mesh with the helical spline 30c of the timing pulley 30. Moreover, the ring-shaped piston 31 is provided with a helical spline 31b which is formed in its outer peripheral surface, and a transmitter member 32 is provided with a helical spline 32a which is formed in its inner peripheral surface so as to mesh with the helical spline 31b of the ring-shaped piston 31.

In addition, the transmitter member 32 is fixed to the cam shaft 14 by way of a cover 34, which is fixed to the cam shaft 14 integrally with a bolt 35 and a pin 44, in a relatively unrotatable manner. Thus, there is formed a space 33 between the timing pulley 30 and the transmitter member 32 which are spaced away from each other. Accordingly, the ring-shaped piston 31 can move in the space 33 along the helical splines 30c, 31a, 31b and 32a in the right and left directions in FIG. 1.

As described above, the ring-shaped piston 31 is disposed in the space 33, and it is further provided with a spring 36 (i.e., the urging member) on its right-hand side in FIG. 1. The spring 36 urges the ring-shaped piston 31 to an initial position where the ring-shaped piston 31 is brought into contact with the cover 34 on its left end in FIG. 1.

Moreover, the left-hand side of the ring-shaped piston 31 in FIG. 1 and the right-hand side of the cover 34 are disposed opposedly each other. Accordingly, there is formed a hydraulic chamber 37 between the ring-shaped piston 31 and the cover 34. In addition, the hydraulic chamber 37 communicates with the above-described operation line 28 by way of a passage 14a which is formed in the cam shaft 14.

Part of the lubricating oil which moves reciprocally in the operation line 28 is adapted for acting on the hydraulic chamber 37, and it also leaks to the space 33 by way of the helical splines 30c, 31a, 31b and 32a. Therefore, a passage 30d is formed in the timing pulley 30 in order not to raise the pressure in the hydraulic chamber 37 to a higher pressure and in order to lubricate an outer peripheral surface of the cam shaft 14.

A damper case 38 is further press-fitted into a flanged portion 30e of the timing pulley 30. An inner peripheral portion of the damper case 38 is slidably brought into contact with an outer peripheral surface of the transmitter member 32 by way of a sealing ring 39. Further, there are formed annular-shaped grooves in the right-hand side of the damper case 38 in FIG. 1 and in a flanged portion 32b of the transmitter member 32. The annular-shaped grooves of the damper case 38 and those of the transmitter member 32 are spaced away from each other, but they mesh each other so as to form a labyrinth groove portion 40. A viscous fluid such as a silicon oil or the like is filled in the labyrinth groove portion 40 so as to form a viscous fluid damping means 41. In addition, sealing rings 42 and 43 are further provided around the viscous fluid damping means 41 in order to hold the viscous fluid therein, and they are adapted to work together with the sealing ring 39.

Operations of the valve opening and closing timing control apparatus 10 thusly constructed will be hereinafter described. First of all, when the electronic control apparatus 12 detects operational conditions of the engine 11 with the engine speed signals or the like, the electronic control apparatus 12 calculates a control target value for controlling the cam shaft 14 by carrying out a PID calculation (i.e., a proportional plus integral plus derivative calculation) or the like so that an optimum valve opening and closing timing is established.

Then, the electronic control apparatus 12 detects a current valve opening and closing timing with the signals which are output by the crank shaft rotary position sensor 15 and the cam shaft rotary position sensor 16, and it compares the detected current valve opening and closing timing with the control target value in order to determine how much the rotary phase of the cam shaft 14 should be varied.

Thereafter, the electronic control apparatus 12 operates the first hydraulic control valve 24 and the second hydraulic control valve 25 under duty cycle control. For instance, when the valve opening and closing timing should be advanced angularly with respect to the current timing, the second hydraulic control valve 25 is fully closed (Namely, it is operated at a duty ratio of "Opening": "Closing"=0:100 and without communicating the first port 25a with the second port 25b), and then the first hydraulic control valve 24 is controlled at a calculated duty ratio. Therefore, a highly pressurized oil which is discharged by the second hydraulic pump 22 is introduced into the operation line 28, and it acts on the hydraulic chamber 37. Accordingly, the ring-shaped piston 31 moves against the urging force of the spring 36 in the right direction in FIG. 1, thereby varying the rotary phases of the timing pulley 30 and the cam shaft 14. Thus, the valve opening and closing timing control apparatus 10 advances the valve opening and closing timing angularly.

When the rotary phase of the cam shaft 14 is varied to the control target value, the electronic control apparatus 12 fully closes the first hydraulic control valve 24 as well as the second hydraulic control valve 25. Thus, the operation line 28 is kept in a fully closed condition, and accordingly the rotary phase variation of the cam shaft 14 is maintained.

As earlier mentioned, the oil introduced into the hydraulic chamber 37 by way of the operation line 28 leaks through various portions, for instance, through the helical splines 30c, 31a, 31b and 32a, the rotary phase of the cam shaft 14 tends to vary gradually. Hence, the electronic control apparatus 12 always detects the valve opening and closing timing, and it carries out feedback control with the hydraulic control means 23.

In addition, the cam shaft 14 is subjected to torques which result from value springs (not shown) disposed around the intake valves and the exhaust valves and which vary in both positive and negative directions. As a result, the cam shaft 14 moves the ring-shaped piston 31 in an axial direction (i.e., in the right and left directions in FIG. 1), and it eventually tries to vary its own rotary phase. However, the rotary phase of the cam shaft 14 does not vary because the viscous fluid damping means 41 absorbs the varying torques in the present preferred embodiment.

On the other hand, when the valve opening and closing timing should be retracted angularly with respect to the current timing, the first hydraulic control valve 24 is fully closed without communicating the first port 24a with the second port 24b and the third port 24c, and then the second hydraulic control valve 25 is controlled so as to operate at a calculated duty ratio. Therefore, the hydraulic pressure acting on the hydraulic chamber 37 is reduced. Accordingly, the ring-shaped piston 31 moves in the left direction in FIG. 1 because it is urged in the direction by the urging force of the spring 36, thereby varying the rotary phases of the timing pulley 30 and the cam shaft 14. Thus, the valve opening and closing timing control apparatus 10 retracts the valve opening and closing timing angularly.

When the rotary phase of the cam shaft 14 is varied to a control target value for the angular retraction, the electronic control apparatus 12 fully closes the second hydraulic control valve 25 as well as the first hydraulic control valve 24. Thus, the operation line 28 is kept in a fully closed condition, and accordingly the rotary phase variation of the cam shaft 14 is maintained. Thereafter, the electronic control apparatus 12 similarly carries out the feedback control as earlier described.

Finally, operations of the hydraulic pressure adjustment valve 46 illustrated in FIG. 2 will be hereinafter described. In addition to a various kinds of information on the engine conditions as aforementioned, the electronic control apparatus 12 also receives signals which are output by the pressure sensor 44 and retrieves information on pressure conditions of the discharge line 26 therefrom.

When the rotary valve varying means 27 holds the rotary phase of the cam shaft 14 or when it retracts the rotary phase angularly, it is unnecessary to introduce the discharge pressures of the second hydraulic pump 22 into the operation line 28. In these circumstances, the electronic control apparatus 12 opens up the hydraulic pressure adjustment valve 46 accordingly. As a result, the loads of the second hydraulic pump 22 can be reduced.

On the other hand, when the rotary valve varying means 27 advances the rotary phase of the cam shaft 14 angularly, it is necessary to introduce a highly pressurized oil into the operation line 28. Hence, if such is the case, the electronic control apparatus 12 controls the opening degrees of the hydraulic pressure adjustment valve 46 by carrying out duty cycle control, and accordingly the hydraulic pressures in the operation line 28 can be adjusted depending on the loads which are required for the rotary phase varying means 27 to advance the rotary phase of the cam shaft 14 angularly. In other words, the larger the loads which are required for the rotary phase varying means 27 to advance the rotary phase of the cam shaft 14 angularly, the smaller the opening degrees of the hydraulic pressure adjustment valve 46 become. Alternatively, when the rotary valve varying means 27 advances the rotary phase of the cam shaft 14 angularly, the hydraulic pressure adjustment valve 46 can be fully closed.

As having been described in detail so far, the electronic control apparatus 12 always detects the rotary positions of the cam shaft 14 and the crank shaft 13, and it operates the rotary phase varying means 27 under the linear control in order to establish an optimum valve opening and closing timing depending on the engine conditions such as the engine speeds, the engine loads, the engine oil temperatures or the like. Hence, the present valve opening and closing timing control apparatus 10 can establish the valve and closing timing at desired occasions, and the present valve opening and closing timings thus established distinguish over the conventional digitized valve opening and closing timing.

In addition, the rotary phase varying means 27 of the present valve opening and closing timing control apparatus 10 employs the viscous fluid damping means 41 which includes the labyrinth groove portion 40. However, the present invention is not limited thereto. Namely, the rotary phase varying means 27 can employ a viscous fluid damping means which includes a plate-shaped portion or the like instead of the labyrinth groove portion 40.

Having now fully described the present invention, it will be apparent to one of ordinary skill in the art that many changes and modifications can be made thereto without departing from the spirit or scope of the present invention as set forth herein including the appended claims.

What is claimed is:

1. A valve opening and closing timing control apparatus, comprising:
   an engine including a cam shaft and a crank shaft;
   a first sensor adapted for detecting rotary positions of said cam shaft;
   a second sensor adapted for detecting rotary positions of said crank shaft;
   a first hydraulic pump and a second hydraulic pump, each driven by said crank shaft, said second hydraulic pump being connected to an output of said first hydraulic pump;
   a rotary phase varying means disposed on said cam shaft and adapted for varying rotary phases of said cam shaft;
   a hydraulic line connecting said second hydraulic pump and said rotary phase varying means;
   a linearly controllable hydraulic control means disposed in said hydraulic line;
   an electronic control means adapted for controlling said hydraulic control means and receiving output signals which are output by said first sensor and said second sensor at least, thereby operating said rotary phase varying means with said hydraulic control means under linear control.

2. The valve opening and closing timing control apparatus according to claim 1, wherein said hydraulic control means includes a first hydraulic control valve and a second hydraulic control valve which are operated under duty cycle control.

3. The valve opening and closing timing control apparatus according to claim 1, wherein said rotary phase varying means includes:
   a timing pulley;
   a piston means engaging with said timing pulley;
   a transmitter member engaging with said timing pulley by way of said piston means and fixed on said cam shaft;
   an urging means adapted for urging said piston means to an initial position; and
   a viscous fluid damping means disposed between said timing pulley and said transmitter member.

4. A valve opening and closing timing control apparatus, comprising:
   an engine including a cam shaft and a crank shaft;
   a first sensor adapted for detecting rotary positions of said cam shaft;
   a second sensor adapted for detecting rotary positions of said crank shaft;
   a first hydraulic pump driven by said crank shaft and a second hydraulic pump driven by said crank shaft and connected in series with an output of said first hydraulic pump;
   a rotary phase varying means disposed on said cam shaft and adapted for varying rotary phases of said cam shaft;
   a hydraulic line connecting said second hydraulic pump and said rotary phase varying means;

linearly controllable hydraulic control means disposed in said hydraulic line; and an electronic control means adapted for linearly controlling said hydraulic control means and receiving output signals which are output by said first sensor and said second sensor at least, thereby operating said rotary phase varying means with said hydraulic control means under linear control.

5. A valve opening and closing timing control apparatus, comprising:

an engine including a cam shaft, a crank shaft and an oil pan;

a first sensor adapted for detecting rotary positions of said cam shaft;

a second sensor adapted for detecting rotary positions for said crank shaft;

a hydraulic pump driven by said crank shaft;

a rotary phase varying means disposed on said cam shaft and adapted for varying rotary phases of said cam shaft;

a hydraulic line connecting said hydraulic pump and said rotary phase varying means;

linearly controllable hydraulic control means disposed in said hydraulic line;

a hydraulic pressure adjustment line connecting between said hydraulic pump and said hydraulic control means in said hydraulic line;

a hydraulic pressure adjustment valve disposed in said hydraulic pressure adjustment line and connected with said oil pan; and an electronic control means adapted for linearly controlling said hydraulic control means and receiving output signals which are output by said first sensor and said second sensor at least thereby operating said rotary phase varying means with said hydraulic control means under linear control, said electronic control means further adapted for controlling said hydraulic control means and said hydraulic pressure adjustment valve.

6. A valve opening and closing timing control apparatus, comprising:

an engine including a cam shaft and a crank shaft;

a first sensor adapted for detecting rotary positions of said cam shaft;

a second sensor adapted for detecting rotary positions of said crank shaft;

a first hydraulic pump driven by said crank shaft and a second hydraylic pump driven by said crank shaft and connected in series with an output of the first hydraulic pump;

a rotary phase varying means disposed on said cam shaft and adapted for varying rotary phases of said cam shaft;

a hydraulic line connecting said second hydraulic pump and said rotary phase varying means;

linearly controllable hydraulic control means disposed in said hydraulic line and operated under duty cycle; and an electronic control means adapted for linearly controlling said hydraulic control means and receiving output signals which are output by said first sensor and said second sensor at least, thereby operating said rotary phase varying means with said hydraulic control means under linear control.

7. A valve opening and closing timing control apparatus, comprising:

an engine including a cam shaft, a crank shaft and an oil pan;

a first sensor adapted for detecting rotary positions of said cam shaft;

a second sensor adapted for detecting rotary positions of said crank shaft;

a hydraulic pump driven by said crank shaft for producing a discharge pressure;

a rotary phase varying means disposed on said cam shaft and adapted for varying rotary phases of said cam shaft;

a hydraulic line connecting said hydraulic pump and said rotary phase varying means;

a linearly controllable hydraulic control means disposed in said hydraulic line for receiving the discharge pressure from said hydraulic pump and selectively opening to communicate the discharge pressure through the hydraulic line to the rotary phase varying means;

a hydraulic pressure adjustment line connecting a portion of said hydraulic line between said hydraulic pump and said hydraulic control means to said oil pan;

a hydraulic pressure adjustment valve disposed in said hydraulic pressure adjustment line for selectively relieving the discharge pressure;

an electronic control means for controlling said hydraulic control means and receiving output signals which are output by said first sensor and said second sensor at least, thereby operating said rotary varying means with said hydraulic control means under linear control, said control means further comprising means for actuating said hydraulic pressure adjustment valve to relieve the discharge pressure when the hydraulic control means is closed.

8. The valve opening and closing timing control apparatus according to claim 7, wherein said hydraulic pump includes a first hydraulic pump and a second hydraulic pump connected to an output of the first hydraulic pump, said hydraulic line connects the second hydraulic pump with said rotary phase varying means, and said hydraulic control means is adapted for receiving discharge pressures which are discharged by the second hydraulic pump.

9. The valve opening and closing timing control apparatus according to claim 7, wherein said hydraulic control means includes a first hydraulic control valve and a second hydraulic control valve which are operated under duty cycle control.

10. The valve opening and closing timing control apparatus according to claim 7, wherein said rotary phase varying means includes:

a timing pulley;

a piston means engaging with said timing pulley;

a transmitter member engaging with said timing pulley by way of said piston means and fixed on said cam shaft;

an urging means adapted for urging said piston means to an initial position; and a viscous fluid damping means disposed between said timing pulley and said transmitter member.

* * * * *